(12) United States Patent
Kurth

(10) Patent No.: US 11,291,916 B2
(45) Date of Patent: Apr. 5, 2022

(54) VIRTUAL SPORTS COMPETITION, HORSE SHOW JUDGE TRAINING SYSTEM, HORSE SHOW COMPETITOR TRAINING VIRTUAL PLATFORM, AND COMPETITOR-TRAINER SEARCHING PLATFORM

(71) Applicant: Deborah Susan Kurth, Los Angeles, CA (US)

(72) Inventor: Deborah Susan Kurth, Los Angeles, CA (US)

( * ) Notice: Subject to any disclaimer, the term of this patent is extended or adjusted under 35 U.S.C. 154(b) by 0 days.

(21) Appl. No.: 17/089,545

(22) Filed: Nov. 4, 2020

(65) Prior Publication Data

US 2021/0299568 A1    Sep. 30, 2021

Related U.S. Application Data

(60) Provisional application No. 63/002,823, filed on Mar. 31, 2020.

(51) Int. Cl.
*A63F 13/67* (2014.01)
*A63F 13/355* (2014.01)

(52) U.S. Cl.
CPC ............ *A63F 13/67* (2014.09); *A63F 13/355* (2014.09)

(58) Field of Classification Search
CPC ................................ A63F 13/355; A63F 13/67
See application file for complete search history.

(56) References Cited

U.S. PATENT DOCUMENTS

| | | | |
|---|---|---|---|
| 8,738,722 B1 | 5/2014 | Gass et al. | |
| 10,671,707 B2* | 6/2020 | Nakai | G16H 20/30 |
| 2010/0332288 A1* | 12/2010 | Higgins | G06Q 30/02 |
| | | | 705/14.45 |
| 2012/0139731 A1* | 6/2012 | Razoumov | G16Z 99/00 |
| | | | 340/573.1 |
| 2012/0254934 A1* | 10/2012 | Mcbrearty | G16H 40/63 |
| | | | 725/118 |
| 2015/0126259 A1 | 5/2015 | Tramontano | |
| 2015/0141203 A1* | 5/2015 | Ohlsen | G06Q 10/0639 |
| | | | 482/9 |
| 2017/0050081 A1 | 2/2017 | Jones et al. | |
| 2020/0338392 A1* | 10/2020 | Thorn | A63B 24/0062 |
| 2021/0299568 A1* | 9/2021 | Kurth | A63F 13/355 |

* cited by examiner

*Primary Examiner* — Reginald A Renwick
(74) *Attorney, Agent, or Firm* — Plager Schack LLP; Mark H. Plager; Stephen Hallberg

(57) ABSTRACT

A virtual sports competition, competitor training, and judge training platform is disclosed. The virtual sports competition, competitor training, and judge training platform provides a virtual, remote, video-based and internet networked platform for sports, such as horse shows, ice skating and other non-conflict based activities to be achieved at different locations and times and still be judged/evaluated by a licensed official. The virtual sports competition, competitor training, and judge training platform reduces costs while ensuring equivalent access for many participants around the world and/or trainee judges seeking to gain credentials for certification.

9 Claims, 6 Drawing Sheets

VIRTUAL SPORTS COMPETITION, HORSE SHOW JUDGE TRAINING SYSTEM, HORSE SHOW COMPETITOR TRAINING VIRTUAL PLATFORM, AND COMPETITOR-TRAINER SEARCHING PLATFORM

CLAIM OF BENEFIT TO PRIOR APPLICATION

This application claims benefit to U.S. Provisional Patent Application 63/002,823, entitled "Virtual Sports Competition," filed Mar. 31, 2020. The U.S. Provisional Patent Application 63/002,823 is incorporated herein by reference.

BACKGROUND

Embodiments of the invention described in this specification relate generally to systems used in sports competitions, and more particularly, to a virtual sports competition, competitor training, and judge training platform.

Presently, conventional sports activities are on-site and at the same time. In particular, sports competitions are limited to a single physical area in order to participate. For example, a horse show competition is conventionally held at a physical location with horses, competitors, coaches, and judges present at the location. There are some problems with limiting such competitions to a particular location, since many people cannot travel to the location and societal restrictions may limit a competitor or judge's ability to be present—such as is common with viral pandemics (COVID-19), or other regional concerns that may prevent travel to the location (e.g., fires or other weather hazards between competitors and destination, etc.).

Using the internet as a base, allows participation by any individual or team, regardless of location. Specifically, there are a wide variety of networking tools and video networking systems that are available to address the problems inherent in requiring presence at a particular location. However, there are no systems presently that take advantage of remote, virtualized video-based competition and training for sports, the competitors and/or judges (including learner judges).

Therefore, what is needed is a way to provide a competition, judging, and training for both competitors and judges in a virtualized, remote manner by using the internet as a base, thereby allowing participation by any individual or team, regardless of location, judging of competitions, and training of both competitors and judges, regardless of location.

BRIEF DESCRIPTION

Some embodiments of the invention include a novel virtual sports competition, competitor training, and judge training platform. In some embodiments, the virtual sports competition, competitor training, and judge training platform provides a virtual, remote, video-based and internet networked platform for sports, such as horse shows, ice skating and other non-conflict based activities to be achieved at different locations and times and still be judged/evaluated by a licensed official. The virtual sports competition, competitor training, and judge training platform reduces costs while ensuring equivalent access for many participants around the world and/or trainee judges seeking to gain credentials for certification.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
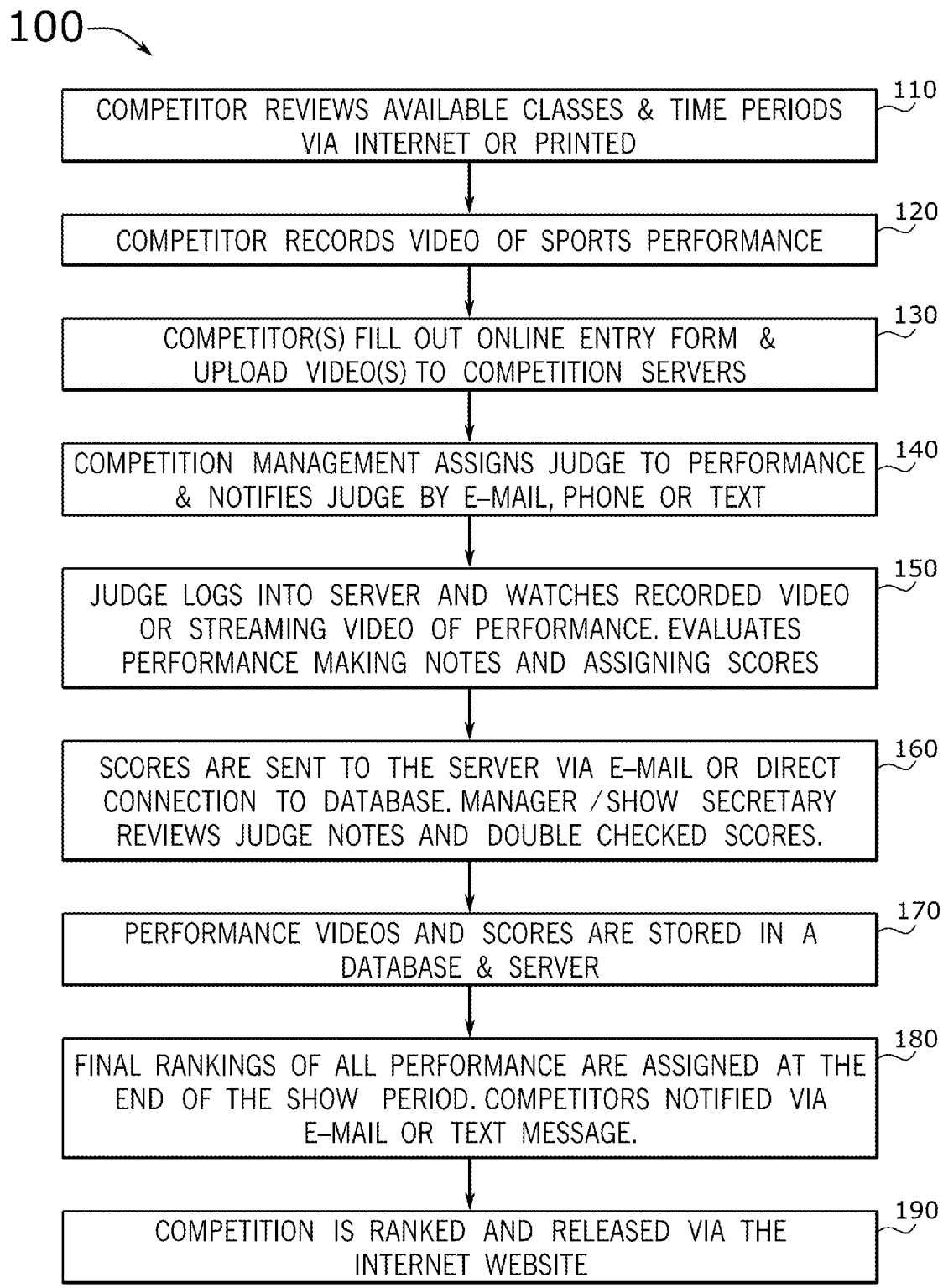
FIG. 1 conceptually illustrates a high level method involved in a virtual sports competition, competitor training, and judge training platform in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel virtual sports competition, competitor training, and judge training platform. In some embodiments, the virtual sports competition, competitor training, and judge training platform provides a virtual, remote, video-based and internet networked platform for sports, such as horse shows, ice skating and other non-conflict based activities to be achieved at different locations and times and still be judged/evaluated by a licensed official. The virtual sports competition, competitor training, and judge training platform reduces costs while ensuring equivalent access for many participants around the world and/or trainee judges seeking to gain credentials for certification.

As stated above, conventionally, sports competitions are limited to a single physical area in order to participate (e.g., a horse show competition that is expected or required to be held at a physical location with horses, competitors, coaches, and judges present at the location). Problems exist with such a limited geospatial manner of holding competitions to a particular location, since many people cannot travel to the location and societal restrictions may limit a competitor or judge's ability to be present—such as is common with viral pandemics (COVID-19), or other regional concerns that may prevent travel to the location (e.g., fires, weather hazards, etc.). But it is possible to use the internet to address some issues of participation, regardless of location. Specifically, there are a wide variety of networking tools and video networking systems that are available to address the problems inherent in requiring presence at a particular location. However, there are no systems presently that take advantage of remote, virtualized video-based competition and training for sports, the competitors and/or judges (including learner judges). Embodiments of the virtual sports competition, competitor training, and judge training platform described in this specification solve such problems by providing a virtual, remote, video-based and internet networked platform for sports, such as horse shows, ice skating and other non-conflict based activities to be achieved at different locations and times and still be judged/evaluated by a licensed official. The virtual sports competition, competitor training, and judge training platform reduces costs while ensuring equivalent access for many participants around the world and/or trainee judges seeking to gain credentials for certification.

Embodiments of the virtual sports competition, competitor training, and judge training platform described in this specification differ from and improve upon currently existing options. In particular, some embodiments differ by using the internet as a method and combining known internet and media tools into a sports competition. Since people are often unable to participate in sports activities because of distance, money, or other limitations (e.g., social distancing and caution involved with COVID-19), the manner of utilizing the internet as a base for the virtual sports competition, competitor training, and judge training platform allows participation by any individual or team, regardless of location.

The virtual sports competition, competitor training, and judge training platform of the present disclosure may be comprised of the following elements.

1. Competitor reviews available competitions, classes & time periods.
2. Competitor(s) records video of sports performance in line with class or activity type.
3. Competitor fill out entry form and uploads video to competition servers.
4. Competition manager assigns judge to performance. Notifies judge by email, phone or text.
5. Judge logs into server and watches performance. Evaluates performance through notes and assigning scores.
6. Scores are sent to server via email or direct database connection. Show manager or show secretary reviews judge's notes and double checks scores.
7. Performance videos/scores are stored in database and/or internet server.
8. End of show period, all videos are reviewed for points and rankings. Competitors are notified via email, phone or text of results. Results can be seen online.

By way of example, FIG. 1 conceptually illustrates a high level method 100 for providing and using a virtual sports competition, competitor training, and judge training platform in some embodiments. The high level method 100 described here involves interaction with a virtual sports competition, competitor training, and judge training platform. An example of a virtual sports competition, competitor training, and judge training platform is described further below, by reference to FIG. 3. As shown in this figure, the high level method 100 for providing and using a virtual sports competition, competitor training, and judge training platform starts with a competitor reviewing (at 110) available classes and time periods via the internet or printed media. Next, the high level method 100 for providing and using a virtual sports competition, competitor training, and judge training platform moves forward to the competitor recording videos (at 120) of a sports performance. In some embodiments, the high level method 100 for providing and using a virtual sports competition, competitor training, and judge training platform includes a step in which the competitor(s) fill out online entry form(s) and upload their videos of their sports performances to competition server (at 130) over a network and via an application interface. Next, the high level method 100 for providing and using a virtual sports competition, competitor training, and judge training platform includes a step in which the competition management assigns a judge to review the performance(s) of the competitor(s) and notifies the just by a conventional manner or an internet or networked manner (at 140) such as email, phone, text message, etc.

After receiving the notification, the high level method 100 for providing and using a virtual sports competition, competitor training, and judge training platform moves ahead to a step at which the judge logs into the server and watches the recorded videos of streaming videos of the performance(s), and upon completion, evaluates the performance(s), making notes and assigning scores (at 150). In some embodiments, the high level method 100 for providing and using a virtual sports competition, competitor training, and judge training platform transitions to the next step of scores being sent to the server (at 160) via email or direct connection to the database. At this stage, the manager, admin, "show secretary" or other authorized personnel reviews the judge's notes and double checked scores. Then the high level method 100 for providing and using a virtual sports competition, competitor training, and judge training platform stores (at 170) the performance videos and scores in a database that is connected to the server. In some embodiments, the high level method 100 for providing and using a virtual sports competition, competitor training, and judge training platform assigns and posts the final rankings of all performances (at 180) at the end of the show/competition period. The competitors are all notified of assigned and posted rankings via email or text message. Finally, the high level method 100 for providing and using a virtual sports competition, competitor training, and judge training platform proceeds to rank the entire competition (at 190) and releases final rankings as assigned and competition rankings via the internet (published to the website). Then the high level method 100 for providing and using a virtual sports competition, competitor training, and judge training platform ends.

The virtual sports competition, competitor training, and judge training platform of the present disclosure generally works by using the internet or any connected network. However, each step should be performed in practice, since this results in creation of the digital media (including video of all types, static images, photos, spoken audio, and written materials) and allows the competition or training to be carried out efficiently over remote physical distances. All is combined to create a sports entry, performance and presentation. Also, competitors would review digital media for the type of competition to be available. By way of example, competitor may be required to create a video showing a performance in an un-cut way and time stamped way, depending on the particular rules of the sport and competition in which the competitor is participating. In some embodiments, the media is a video-based media and is presented as one continuous stream of video, with no editing or cuts. The media materials would be uploaded over the network (e.g., internet) to a video server and a system server (or competition server) and would also be stored in a database in some cases. Then, the competition server would notify a judge of the received media materials for evaluation.

To make the virtual sports competition, competitor training, and judge training platform of the present disclosure, a person would create a website that involves uploading videos to a server and providing a software method for judges to evaluate the stored uploaded videos or streamed performance via the internet. The evaluation includes audio recordings, written descriptions, and assigned scores for movements or performance. While the method of competition presentation may vary from competition to competition, and from sport to sports, the video material, is generally understood to be provided for evaluation in recorded or streamed manner. Furthermore, in the streamed live videos can be recorded for storage in a database.

To use the virtual sports competition, competitor training, and judge training platform of the present disclosure, one would interact with an application on a computing device via the internet to provide sports competitions to those who are unable to attend a physical location. Yet still retain access to licensed officials on the performance and comparison to others performing the same test level or pattern. An example would be a dressage horse show competition. Each "ride" is achieved by performing a per-determined set of movements. Recording of these movements could be remotely evaluated by judges watching the videos and writing their own comments individually or using secretaries/agents. On site locations may be remote entries into the same class for placement and point assignment.

Figure 2:
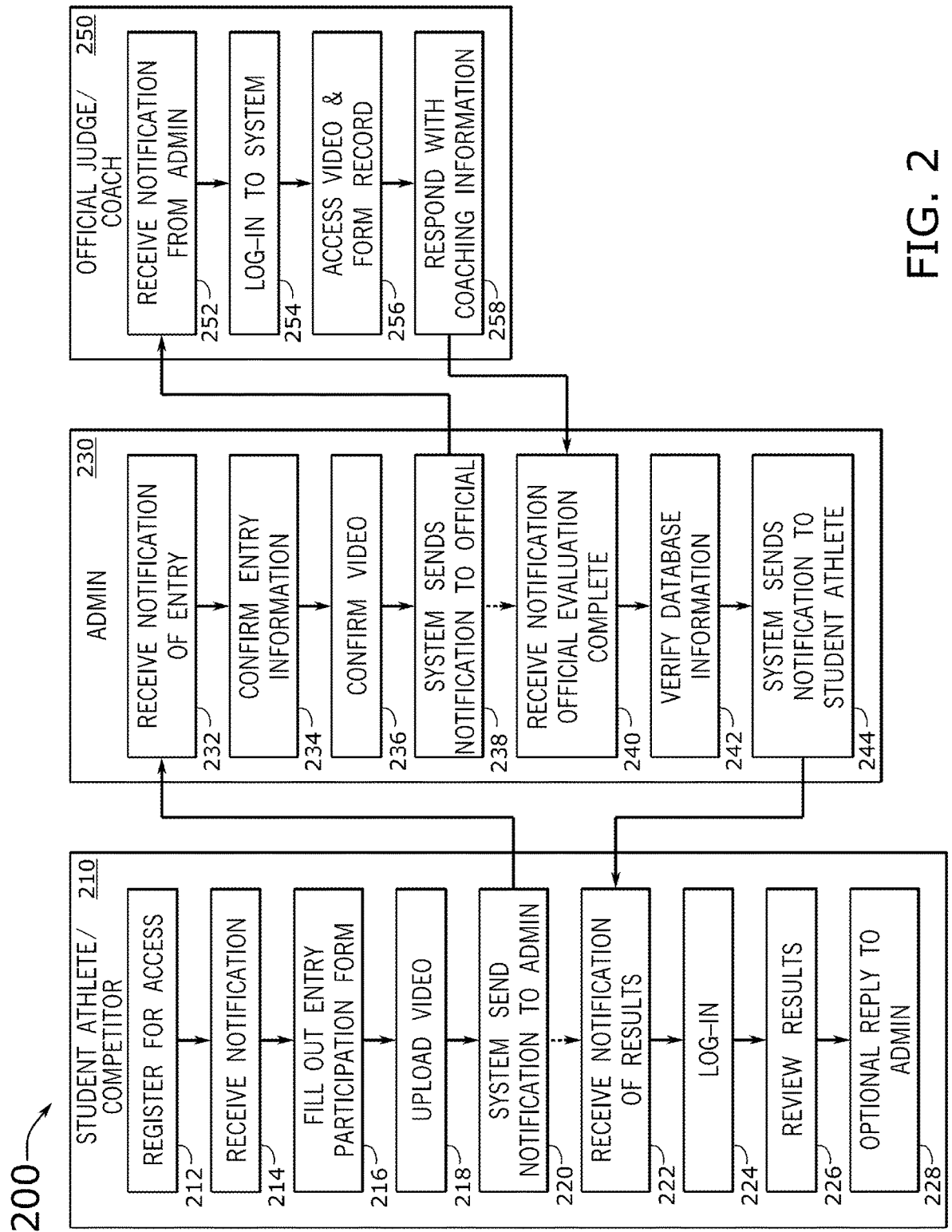
FIG. 2 conceptually illustrates a detailed virtual sports competition, competitor training, and judge training platform process in some embodiments.

Now, turning to a more detailed example, FIG. 2 conceptually illustrates a detailed virtual sports competition, competitor training, and judge training platform process 200 in some embodiments. As shown in this figure, the detailed virtual sports competition, competitor training, and judge training platform process 200 includes at least three different entities (or "users" or "actors"), namely, a student athlete/competitor user 210 (a competitor engaged in judged competitions, a student learning from a coach how to improve their competition performances, etc.), an admin user 230 (such as a show manager, show secretary, competition manager, etc.), and an official judge/coach user 250 (a certified judge for a sport or competitive event, a coach with experience in judging or teaching competition readiness, etc.). In some embodiments, the detailed virtual sports competition, competitor training, and judge training platform process 200 starts with the student athlete/competitor user 210 registering for access (at 212). Next, the student athlete/competitor user 210 receives a notification (at 214) of the registration which includes an entry participation form, or a link to an entry participation form, which the student athlete/competitor user 210 is required to complete.

In some embodiments, the detailed virtual sports competition, competitor training, and judge training platform process 200 moves to the next step at which the student athlete/competitor user 210 fills out the entry participation form (at 216). Next, the detailed virtual sports competition, competitor training, and judge training platform process 200 presents a video upload tool (or selectable button) that allows the student athlete/competitor user 210 to upload a video (at 218) of the sports performance as recorded of the student athlete/competitor user 210 performing. In some embodiments, the video upload tool connects to a video server and the video is uploaded to a database by way of the video server. In some embodiments, the database and the video server are components of a virtual sports competition, competitor training, and judge training platform. An example of a virtual sports competition, competitor training, and judge training platform is described further below, by reference to FIG. 3. In addition to the student athlete/competitor user 210 being able to upload a video of the performance, in some embodiments, the admin user 230 has access to the database to confirm the video performance is available to be judged, and the official judge/coach user 250 has access to the database to download the video performance or stream the video performance during evaluation of the performance. After uploading the video (at 218), the detailed virtual sports competition, competitor training, and judge training platform process 200 proceeds to the next step of sending a notification (at 220) to the admin user 230. In a linear flow of the detailed virtual sports competition, competitor training, and judge training platform process 200, the student athlete/competitor user 210 would only continue with the remaining steps after receiving notification of results (at 222), which is described further below. However, before the student athlete/competitor user 210 receives the notification of results (at 222), the detailed virtual sports competition, competitor training, and judge training platform process 200 transitions the process flow first over to the admin user 230 to complete several steps, then over to the official judge/coach user 250 to complete several steps, then back to the admin user 230 to complete a few remaining steps, and finally, back to the competitor user 210 to finish out the steps.

In some embodiments, the detailed virtual sports competition, competitor training, and judge training platform process 200 transitions to the admin user 230 who receives (at 232) notification of entry of the student athlete/competitor user 210. In some embodiments, the notification of entry includes information from the entry participation form filled out by the student athlete/competitor user 210 and a link to the video performance uploaded to the database by way of the video server. Next, the entry information is confirmed (at 234) by the admin user 230. Then the admin user 230 confirms the video (at 236) associated with the video link. In some embodiments, the detailed virtual sports competition, competitor training, and judge training platform process 200 then sends a notification (at 238) to the official judge/coach user 250.

In some embodiments, the detailed virtual sports competition, competitor training, and judge training platform process 200 transitions over to the official judge/coach user 250 who receives (at 252) the notification from the admin user 230. When the notification is received and read, the official judge/coach user 250 logs into (at 254) the virtual sports competition, competitor training, and judge training platform. After log-in, the official judge/coach user 250 accesses the video and the entry participation form records (at 256) from the database. At this point, the official judge/coach user 250 watches the video performance and provides a judged critique, a competition point value, or coaching information. Then the detailed virtual sports competition, competitor training, and judge training platform process 200 sends a response (at 258) with the judged critique, the competition point value, or the coaching information back to the admin user 230.

In some embodiments, the detailed virtual sports competition, competitor training, and judge training platform process 200 transitions back to the admin user 230 to carry out the remaining steps, starting with receiving a notification of official evaluation being completed (at 240). Next, the detailed virtual sports competition, competitor training, and judge training platform process 200 verifies database information (at 242), followed by sending a notification (at 244) to the student athlete/competitor user 210.

In some embodiments, the detailed virtual sports competition, competitor training, and judge training platform process 200 now transitions back over to the student athlete/competitor user 210 to complete the remaining steps, starting with receiving notification of the results (at 222). Next, the student athlete/competitor user 210 performs log-in (at 224) to the virtual sports competition, competitor training, and judge training platform. After validated log-in, the student athlete/competitor user 210 reviews the results (at 226), followed by making an optional reply (at 228) to the admin user 230. The admin user 230 may forward reply information to the official judge/coach user 250 and further delivery messages back and forth between the student athlete/competitor user 210 and the official judge/coach user 250. When they are done communicating, the detailed virtual sports competition, competitor training, and judge training platform process 200 ends.

Figure 3:
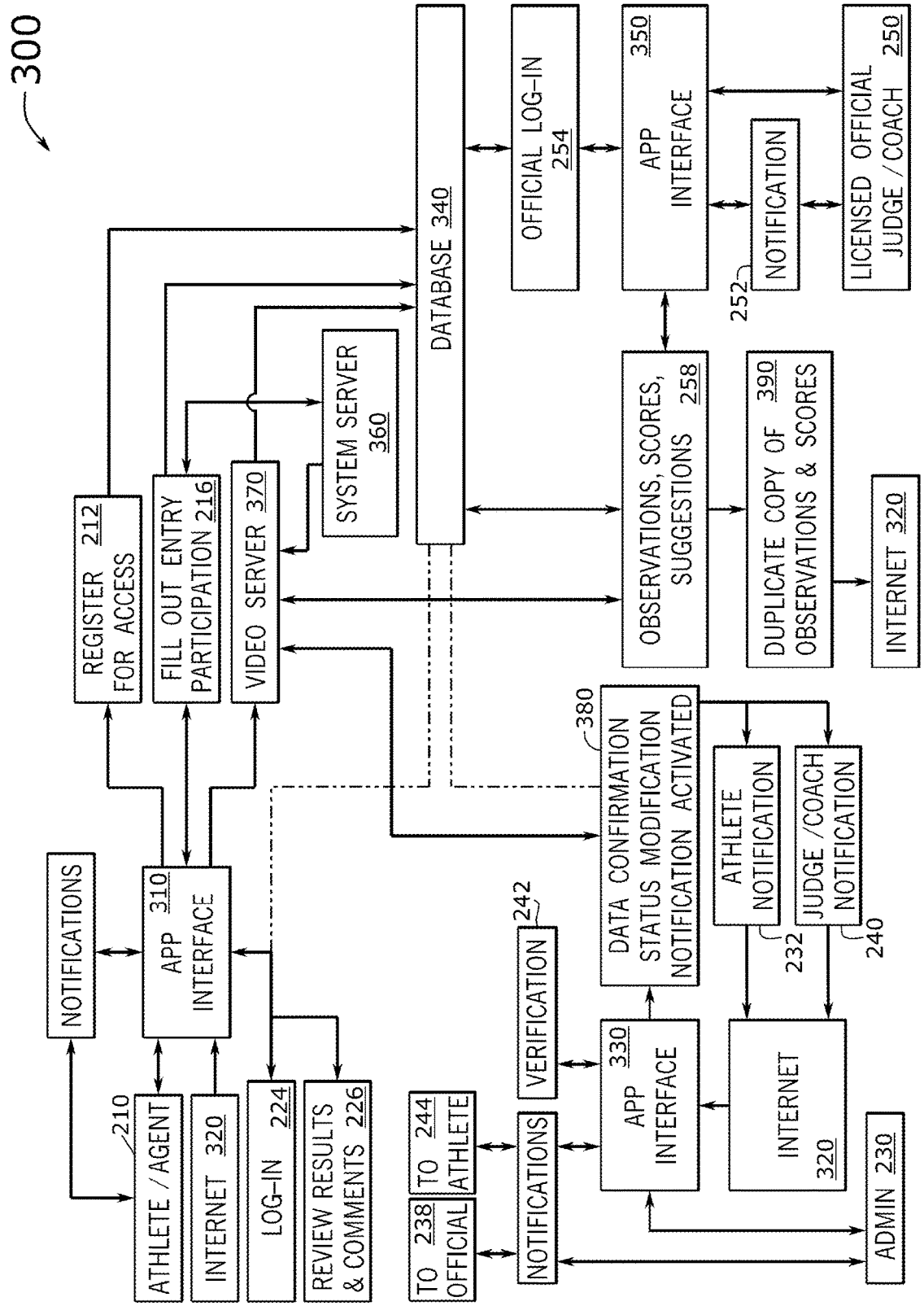
FIG. 3 conceptually illustrates a virtual sports competition, competitor training, and judge training platform in some embodiments.

By way of example, FIG. 3 conceptually illustrates a virtual sports competition, competitor training, and judge training platform 300 in some embodiments. In some embodiments, the virtual sports competition, competitor training, and judge training platform 300 is accessible to users, such as the student athlete/competitor user 210 (also referred to in this example as the "athlete/agent user 210"), the admin user 230, and the official judge/coach user 250. Generally, the athlete/agent user 210 and the official judge/coach user 250 use computing devices (such as computers, laptops, smartphones, tablets, etc.) to connect to the virtual sports competition, competitor training, and judge training platform 300. In some embodiments, the admin user 230 also uses a computing device (such as computers, laptops, smartphones, tablets, etc.) to connect to the virtual sports competition, competitor training, and judge training platform 300. In some other embodiments, the admin user 230 is automated as a software-implemented actor that performs operations on a server of the virtual sports competition, competitor training, and judge training platform 300.

In some embodiments, the student athlete/competitor user 210 interacts with an athlete/agent app interface 310 of software that is running on the computing device. The athlete/agent app interface 310 transmits and displays received notifications and allows the student athlete/competitor user 210 to provide information about themselves as well as video performance content to be evaluated virtually by coaches or judged by official competition judges. In some embodiments, the admin user 230 interacts with an admin app interface 330 of software that is running on the computing device. The admin app interface 330 transmits outgoing notifications and retrieves incoming notifications for display in the admin app interface, while also enabling the admin user 230 to confirm information and video performance content provided by the student athlete/competitor user 210. The admin app interface 330 also allows for selection of coach or judge, and once assigned, maintains the assignment between coach or judge and the student athlete/competitor user 210 for a suitable duration. The duration may vary, for example, an ongoing duration for a coach, a single competition for a judge. The admin app interface 330 manages the interaction with the coach or judge, specially providing notifications with access to the information about the student athlete/competitor user 210 and link(s) to video (s) stored in a database 340 of the virtual sports competition, competitor training, and judge training platform 300, with the relevant competition performance video content as recorded and provided by the student athlete/competitor user 210. In some embodiments, the official judge/coach user 250 interacts with a licensed official judge/coach app interface 350 of software that is running on the computing device. In each case, connectivity is over the internet 320. The licensed official judge/coach app interface 350 allows the licensed official judge or coach to obtain the text information in the entry participation form 216 and the video performance provided by the student athlete/competitor user 210, and to transmit results information back to the admin user 230 after judging the video performance or coaching/instructional information after evaluating the video performance.

In some embodiments, the student athlete/competitor user 210 interacts with the athlete/agent app interface 310 to register for access (at 212). Registration details of the student athlete/competitor user 210 are stored in the database 340 of the virtual sports competition, competitor training, and judge training platform 300. After registration, the student athlete/competitor user 210 fills out the entry participation form 216 via the athlete/agent app interface 310. The entry participation form 216 is provided to a system server 360 of the virtual sports competition, competitor training, and judge training platform 300 and stored in the database 340. By interacting with the athlete/agent app interface 310, the student athlete/competitor user 210 then uploads the video performance to a video server 370 of the virtual sports competition, competitor training, and judge training platform 300. The video performance is also stored in the database 340.

The admin user 230 is notified via the admin app interface 330 when data confirmation status modification notification is activated 380, such that uploads of new entry participation forms 216 and/or video performances stored in the database 340 via video server 370 trigger an event-based athlete notification 232 to be delivered over the internet 320 to the admin app interface 330 for the admin user 230. Then the admin user 230 may notify the licensed official judge or coach via a notification sent to the official 238. When the licensed official judge or coach receives the notification 240, verification 242 of the details and video are completed, and notification is sent to the athlete 244.

Several of the steps performed by the admin user 230 are dependent upon the steps performed by the licensed official judge or coach interacting with the licensed official judge/coach app interface 350, which receives the notification 252, to which the licensed official judge or coach performs official log-in 254 and then accesses the database 340 to retrieve the video performance and the entry participation form 216 details. The licensed official judge or coach then watches the video performance and evaluates, critiques, or otherwise provides observations, scores, and suggestions 258 about the performance, which are stored in the database 340, transmitted to the video server 370 that triggers the data confirmation status modification notification activated 380 to inform the admin user 230, and duplicated as a local stored copy for the licensed official judge or coach, which can thereafter be delivered to the student athlete/competitor user 210 over the internet 320 as a complementing communication mechanism outside of the virtual sports competition, competitor training, and judge training platform 300. Then, when the student athlete/competitor user 210 receives notification that the video performance evaluation or judging is completed, the student athlete/competitor user 210 would perform log-in 224 to the virtual sports competition, competitor training, and judge training platform 300 via the athlete/agent app interface 310, and then review the results and comments 226 from the licensed official judge or coach.

Figure 4:
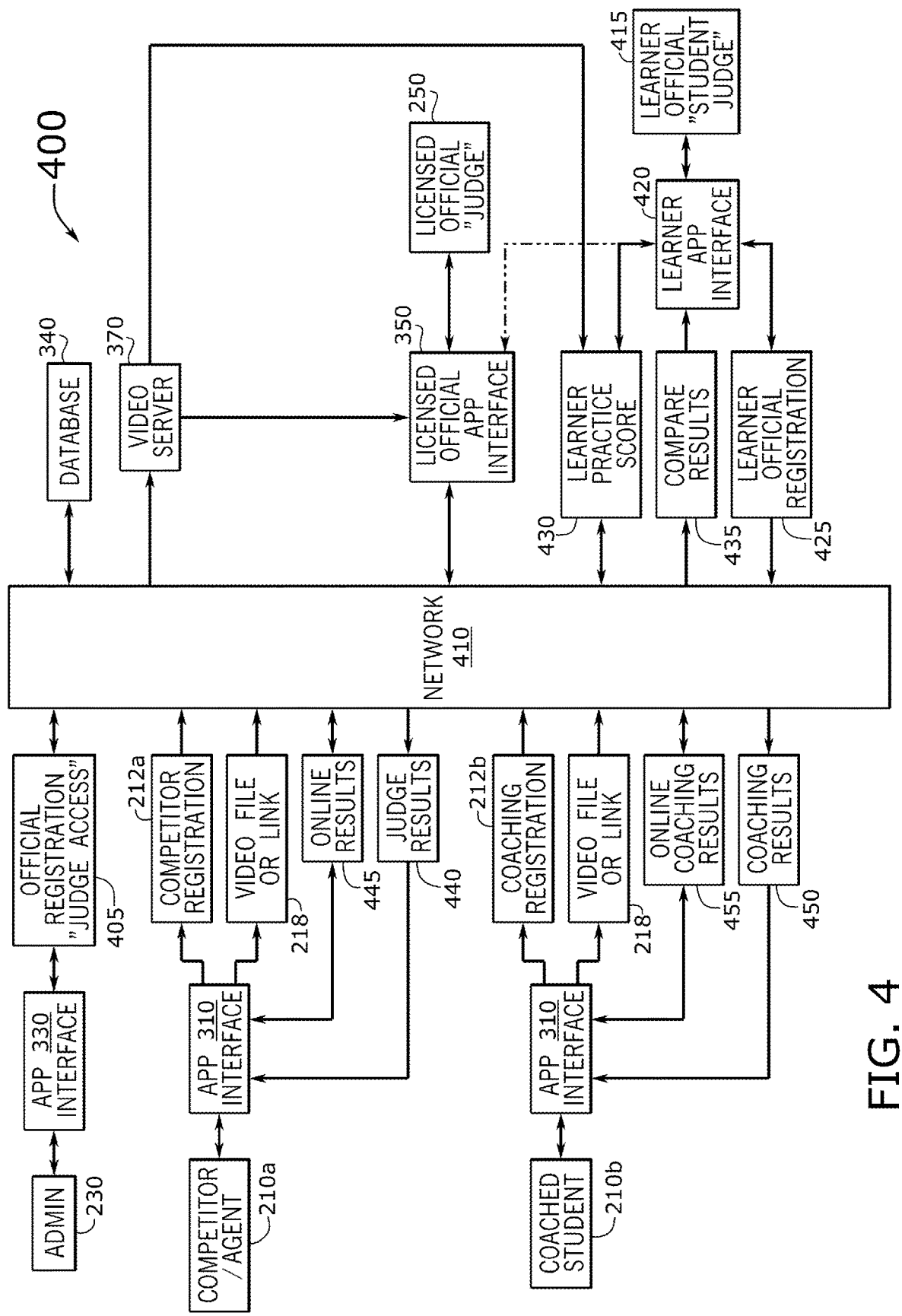
FIG. 4 conceptually illustrates a network architecture of a cloud-based virtual sports competition, competitor training, and judge training platform.

By way of another example, FIG. 4 conceptually illustrates a network architecture of a cloud-based virtual sports competition, competitor training, and judge training platform 400 in some embodiments. The cloud-based virtual sports competition, competitor training, and judge training platform 400 includes an admin user 230, a competitor/agent user 210a, and a coached student user 210b. The competitor/agent user 210a and the coached student user 210b differentiate between different types of student athlete/competitor users 210. Furthermore, the cloud-based virtual sports competition, competitor training, and judge training platform 400 includes a licensed official judge user 250 (also referred to as "judge 250") and a learner official student judge user 415 (also referred to as "student judge 415"). The judge 250 and the student judge 415 highlight the distinction between an official judge/coach user 250, who is certified or otherwise recognized as being allowed to judge official competitions, and a student judge 415 who is not allowed to independently judge official competitions and requires a certain number of mentored competition judging experiences under the supervision and tutelage of the official judge/coach user 250. Thus, when circumstances dictate social distancing or otherwise prevents a student judge from being present with an official judge/coach user 250 at a live competition, the cloud-based virtual sports competition, competitor training, and judge training platform 400 allows virtual training for such student judge, when permitted and officially condoned or recognized by the relevant competition governing bodies.

As shown in this figure, the admin user 230 connects to the cloud-based virtual sports competition, competitor training, and judge training platform 400 over a network 410 (such as the Internet) and interacts with the admin app interface 330 to perform operations, review information, and otherwise carry out administrative functions as they pertain to the competitor/agent user 210a, the coached student user 210b, the judge 250, and the student judge 415. Once such operation is to perform official registration for judge access 405.

Also, the competitor/agent user 210a interacts with the athlete/agent app interface 310 to complete competitor registration 212a and upload a video file or link to video file 218 with the video performance content of the competitor/agent user 210a carrying out the actual competition requirements. The competitor registration 212a is transmitted over the network 410 and stored in the database 340. The video file or link 218 is also transmitted over the network 410 to the video server 370 and stored in the database 340. Similarly, the coached student user 210b interacts with the athlete/agent app interface 310 to complete a coaching registration 212b and upload a video file or link to video file 218 with a coached video performance of the coached student user 210b performing the requirements of the competition coaching. The coaching registration 212b is transmitted over the network 410 and stored in the database 340 and the video file or link 218 is also transmitted over the network 410 to the video server 370 and stored in the database 340.

Upon receiving a notification from the admin user 230, the judge 250 interacts with the licensed official app interface 350 to retrieve the video and the information to start judging a competition performance or evaluating a coached competition performance. Contemporaneously, the student judge 415 interacts with a learner app interface 420, which is communicably connected to the licensed official app interface 350 (thereby permitting the student judge 415 to evaluate or judge), in order to provide official learner registration 425 and submit learner practice scoring 430.

Since the official judge 250 may also make official scoring of the video performance for the competition via the licensed official app interface 350, the student judge 415 is able to compare results 435 with the learner practice score 430, due to the fact that all scoring of the competition by official judges are transmitted over the network 410. In this way, the student judge 415 and the official judge 250 (mentor or teacher) can be physically separated over any geospatial distance, yet still be able to conduct official scoring and learner scoring for the competition video performance(s) being judged or evaluated.

After scoring results are submitted by the judge 250, the judge results 440 are sent to the competitor/agent user 210a over the network 410 and the coaching results 450 are sent to the coached student user 210b over the network 410. In some embodiments, the judge results 440 and the coaching results 450 are indicated by links in notifications sent to the athlete/agent app interface 310, while the judge results 440 and the coaching results 450 are posted online. As such, the results are then accessible to the competitor/agent user 210a and/or the coached student user 210b over the network 410. In other words, the competitor/agent user 210a interacts with the athlete/agent app interface 310 to retrieve the online results 445 as published at the linked site over the network 410. Similarly, the coached student user 210b interacts with the athlete/agent app interface 310 to retrieve the online coaching results 455 as published at the linked site over the network 410.

Figure 5:
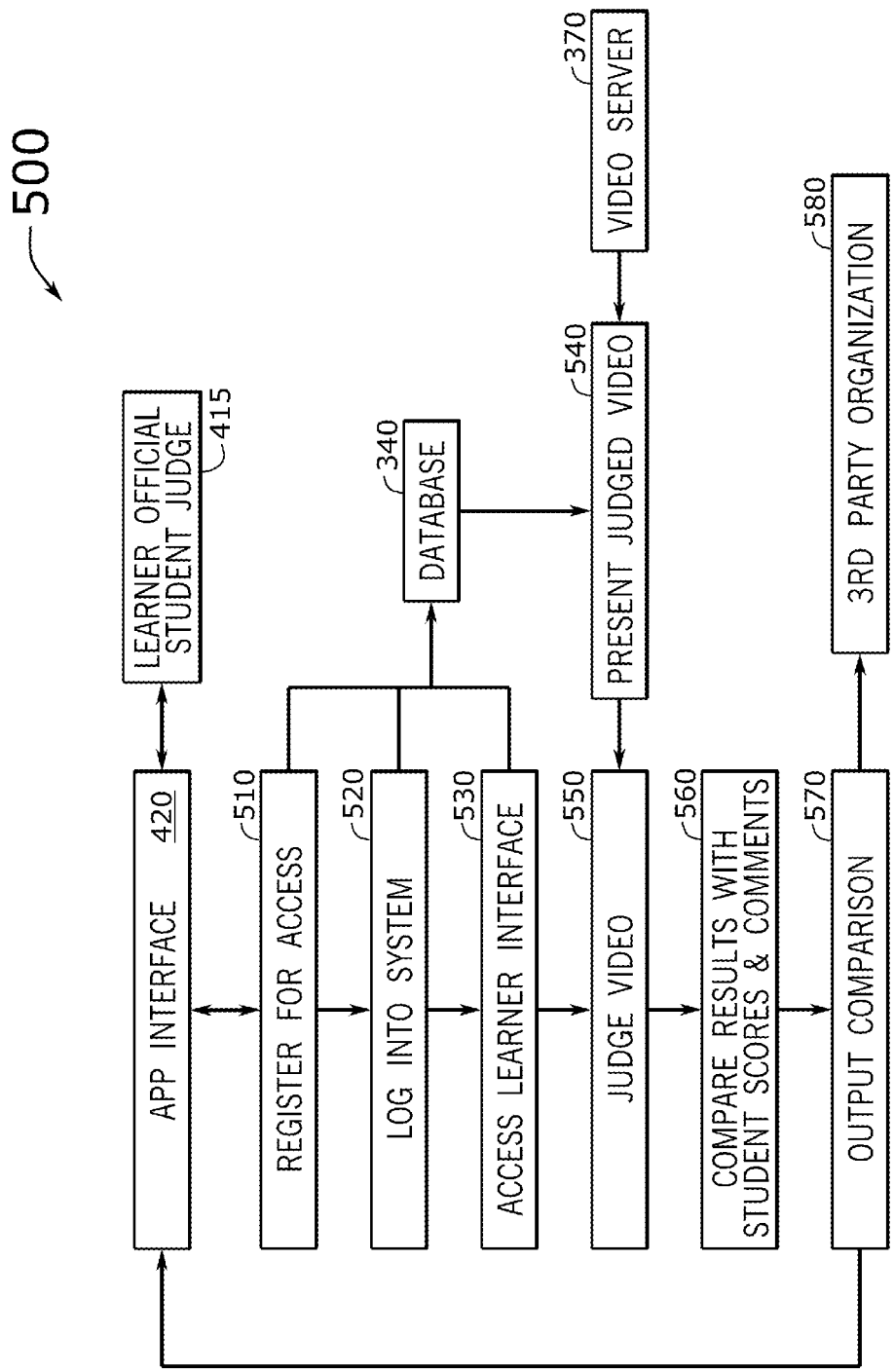
FIG. 5 conceptually illustrates a process for student judges to evaluate sports competition videos over the virtual sports competition, competitor training, and judge training platform in some embodiments.

Now turning to another example, FIG. 5 conceptually illustrates a process for student judges to evaluate sports competition videos over the virtual sports competition, competitor training, and judge training platform 500 in some embodiments. As shown in this figure, the process for student judges to evaluate sports competition videos over the virtual sports competition, competitor training, and judge training platform 500 starts when a learner official student judge 415 interacts with a learner app interface 420 to register (at 510) for access to the virtual sports competition, competitor training, and judge training platform (such as the cloud-based virtual sports competition, competitor training, and judge training platform 400 described above, by reference to FIG. 4). The registration information provided by the learner official student judge 415 is then stored in the database 340.

Next, the process for student judges to evaluate sports competition videos over the virtual sports competition, competitor training, and judge training platform 500 moves ahead to the next step in which the learner official student judge 415 logs into the virtual sports competition, competitor training, and judge training platform (at 520). The information is checked and validated based on log-in credentials for the learner official student judge 415 stored in the database 340.

After log-in is completed, the process for student judges to evaluate sports competition videos over the virtual sports competition, competitor training, and judge training platform 500 proceeds to the next step at which the learner official student judge 415 accesses the learner interface (at 530) of the app. As noted above, the learner interface may be communicably connected to an official judge. When accessing the learner app interface 420, the learner official student judge 415 then judges the video (at 550) with the competition performance content. In some embodiments, the video is retrieved from the database 340 via the video server 370, thereby allowing the process for student judges to evaluate sports competition videos over the virtual sports competition, competitor training, and judge training platform 500 to present (at 540) the judged video to the learner official student judge 415. Next, the learner official student judge 415 may compare results with student scores and comments (at 560), such as comments made by the official judge or others. In some embodiments, the process for student judges to evaluate sports competition videos over the virtual sports competition, competitor training, and judge training platform 500 outputs (at 570) the comparison results, allowing for transmission to or organization by a third party (at 580).

In some embodiments, the process for student judges to evaluate sports competition videos over the virtual sports competition, competitor training, and judge training platform 500 then returns to the learner app interface 420, thereby allowing the learner official student judge 415 to judge more video competition presentations and gain valuable experience.

Additionally, some embodiments of the virtual sports competition, competitor training, and judge training platform could be used in schools for audio presentation, such as a debate or any audio presentation. In that case, a teacher become the elevator.

Furthermore, the virtual sports competition, competitor training, and judge training platform can produce an evaluation report in which the competitor can use the results to improve their performance. Additionally, the virtual sports competition, competitor training, and judge training platform is able to create a composition of all media provided by a competitor, including any or all of images/photos, audio, video, and/or written communications.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute the operations of the software programs.

Figure 6:
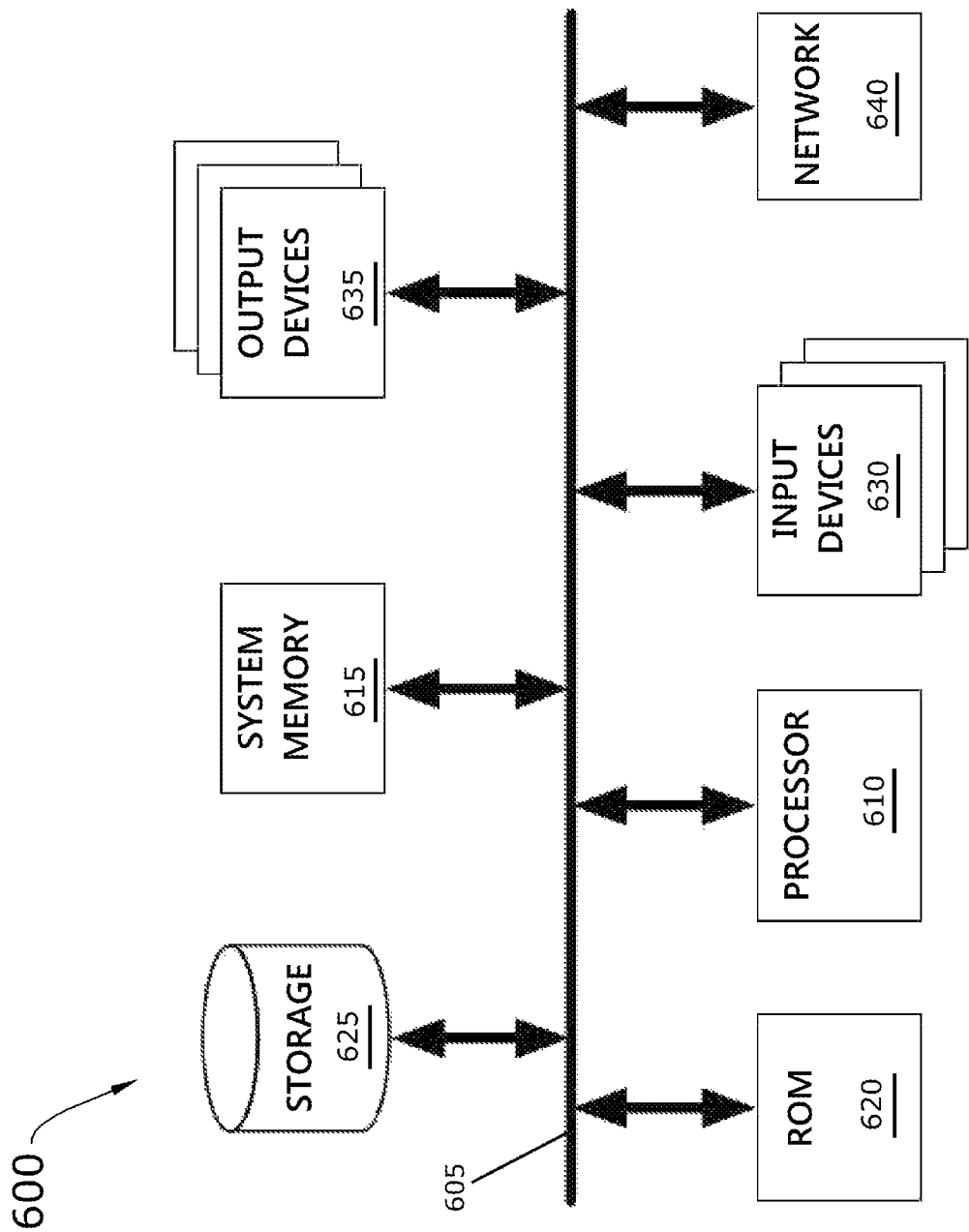
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (or computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1, 2, and 5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A virtual sports competition and training platform comprising:
    a competitor app interface comprising a video upload tool that is configured to upload a video recording of a competitor user engaged in a competition activity for a particular competition, wherein the competitor app interface is visually output on a competitor computing device operated by the competitor user, wherein the competitor computing device is communicably connected to a video camera that is configured to capture the video recording when the competitor user is engaged in the competition activity for the particular competition, wherein the captured video recording is uploaded via the video upload tool for presentation as a competition video performance of the competitor user for judged evaluation by a competition judge associated with the particular competition;
    a licensed official app interface that is visually output on a judge computing device operated by a competition judge user, wherein the judge computing device is configured to retrieve recorded video performances of competitors, wherein the licensed official app interface allows the competition judge user to view recorded video performances of competitors, judge the video performances, and provide feedback information to the competitors;
    an admin app interface that is visually output on an admin computing device operated by a competition administrator user responsible for (i) confirming competition entry information and video performance content provided by the competitor user and, upon confirming video performance content, (ii) notifying the competition judge user of the video performance to view, judge, and provide feedback to the competition user;
    a cloud server that hosts a cloud-based virtual sports competition, competitor training, and judge training application service to which the competitor app interface, the licensed official app interface, and the admin app interface connect over a network to conduct a virtual sports competition in which the competitor user, the competition judge user, and the competition administrator are physically separated over geospatial distances; and
    a video server that is communicably connected to a video database, wherein the video server is configured to (i) receive the competition video performance of the competitor user, from the competitor computing device by way of the video upload tool of the competitor app interface, for judged evaluation by the competition judge associated with the particular competition, (ii) store the competition video performance in the video database, and (iii) trigger an event-based athlete notification that is delivered to the admin app interface for the competition administrator user to confirm the competition video performance stored in the video database includes video content of the competitor user in relation to the particular competition and, upon confirmation, to notify the competition judge user that that competition video performance stored in the video database is confirmed for viewing, judging, and providing feedback to the competition user.

2. The virtual sports competition and training platform of claim 1, wherein the video server runs on the cloud server, wherein the video database is a cloud database that is communicably connected to the cloud server and accessible to the competitor app interface running on the competitor computing device, the licensed official app interface running on the judge computing device, and the admin app interface running on the admin computing device by way of network connections from each of the competitor computing device, the judge computing device, and the admin computing device to the cloud-based virtual sports competition, competitor training, and judge training application service.

3. The virtual sports competition and training platform of claim 2, wherein the cloud database receives the competition video performance of the competitor user from the video server for database storage in connection with an online entry form completed by the competitor user for participation in the particular competition.

4. The virtual sports competition and training platform of claim 3, wherein the competition judge user receives, in the licensed official app interface, an admin confirmation notification from the admin computing device that the competition video performance of the competitor user is confirmed and available to retrieve as a video file from the cloud database to view, judge, and provide feedback to the competition user.

5. The virtual sports competition and training platform of claim 4, wherein the admin confirmation notification comprises a link to the competition video performance and the online entry form stored in the cloud database.

6. The virtual sports competition and training platform of claim 5, wherein the competitor app interface is configured to (i) receive input from the competitor user to complete the online entry form and (ii) receive a judge notification from the judge computing device based on results judged by the competition judge user after viewing and judging the competition video performance and providing feedback to the competitor user of the competition video performance.

7. The virtual sports competition and training platform of claim 6, wherein judge scoring for the particular competition are published online after the competition judge user has reviewed the competition video performance and judged the competition video performance for competition scoring.

8. The virtual sports competition and training platform of claim 1 further comprising a learner judge app interface that is visually output on a learner student judge computing device operated by a learner student judge user, wherein the learner judge app interface allows the learner student judge user to view recorded video performances of competitors and provide learner practice scores of the video performances under supervision of the competition judge user.

9. The virtual sports competition and training platform of claim 8, wherein the learner judge app interface is operable by the learner student judge user only when communicably connected to the licensed official app interface used by the competition judge user.

* * * * *